United States Patent [19]

Blackburn et al.

[11] Patent Number: 4,885,033

[45] Date of Patent: Dec. 5, 1989

[54] PIGMENT COMPOSITIONS BASED ON ACETOACETARYLIDE DERIVATIVES

[75] Inventors: John B. Blackburn, Beith; Alexander Hamilton, Glasgow, both of Scotland

[73] Assignee: Ciba-Geigy Corporation, Ardsley, N.Y.

[21] Appl. No.: 248,078

[22] Filed: Sep. 23, 1988

[30] Foreign Application Priority Data

Oct. 3, 1987 [GB] United Kingdom ............... 8723257
Oct. 14, 1987 [GB] United Kingdom ............... 8724085

[51] Int. Cl.$^4$ ................................................. C08K 5/00
[52] U.S. Cl. ........................................ 106/494; 106/493; 106/500; 106/504
[58] Field of Search ................. 106/493, 494, 500, 504

[56] References Cited

U.S. PATENT DOCUMENTS

| | | |
|---|---|---|
| 3,776,749 | 12/1973 | McKay et al. |
| 4,461,647 | 7/1984 | Schofield et al. |
| 4,474,609 | 10/1984 | Ehl et al. ............................ 106/494 |
| 4,720,304 | 1/1988 | Ruff et al. ........................... 106/494 |
| 4,810,302 | 3/1989 | Funafsu et al. ..................... 106/494 |

OTHER PUBLICATIONS

E. W. Flinck, "Printing Ink Formulations", Noyes, pp. 110 and 177.

Primary Examiner—Paul Lieberman
Assistant Examiner—Willie J. Thompson
Attorney, Agent, or Firm—Luther A. R. Hall

[57] ABSTRACT

A pigment composition, suitable for use in modern offset and letter press inks, comprising:

(A)
  (a) a pigment derived from (i) acetoacet-2,4-xylidide coupled on to tetrazotized 3,3'-dichlorobenzidine or from (ii) the mixed coupling of two or more of acetoacetanilide, acetoacet-2-anisidide, acetoacet-2-toluidide, acetoacet-2-chloranilide, acetoacet-2,4-xylidide and acetoacet-2,5-dimethoxy-4-chloranilide on to tetrazotized 3,3'-dichlorobenzidine;
  (b) a dyestuff derived from coupling acetoacetanilide, acetoacet-2-toluidide, acetoacet-2-chloranilide or acetoacet-2,4-xylidide on to tetrazotized benzidine-2,2'-disulfonic acid; and optionally
  (c) a resin or resinous material
and
(B)
  (a) a pigment derived from coupling one or more of acetoacetanilide, acetoacet-2-anisidide, acetoacet-2-toluidide, acetoacet-4-toluidide, acetoacet-2-chloranilide, acetoacet-2,4-xylidide and acetoacet-2,5-dimethoxy-4-chloranilide on to one or both of tetrazotized 3,3'-dichlorobenzidine and tetrazotized 3,3'-dimethoxybenzidine; and
  (b) an aliphatic amine, the ratio of components (A) and (B) in the pigment composition of the invention ranging from 35:65 to 95:5 % by weight.

15 Claims, No Drawings

PIGMENT COMPOSITIONS BASED ON ACETOACETARYLIDE DERIVATIVES

The present invention relates to new pigment compositions, to their production and to their use in producing highly concentrated dispersions and inks for use in modern offset and letterpress inks.

In the field of modern offset and letterpress printing there is a need for pigment dispersions having a high (35-50% by weight) pigment concentration in a hydrocarbon solvent base, having good rheology and providing inks giving acceptable colouristic performance.

In British patent specification No. 1,356,253, there are described pigment compositions comprising a diarylide pigment and a water-soluble azo dyestuff and, optionally, inter alia, an aliphatic amine, which provide inks having excellent properties.

Certain products, falling within the broad terms of GB 1,356,253, because of their inherent good properties in letter press inks, have been examined as candidates for satisfying the need highlighted above.

Thus, a pigment composition comprising (a) a pigment derived from the mixed coupling of acetoacet-2-methylanilide and acetoacet-2,4-xylidide on to tetrazotised 3,3'-dichlorobenzidine, (b) a dyestuff derived from acetoacet-2,4-xylidide coupled on to tetrazotised benzidine-2,2'-disulfonic acid, and (c) disproportionated rosin, was considered but was found to be only just fluid at a pigment concentration of 35% by weight and, moreover, is colouristically weak.

A pigment composition containing (a) a pigment derived from the mixed coupling of acetoacet-2,4-xylidide and acetoacet-2-chloranilide on to tetrazotised 3,3'-dichlorobenzidine, (b) a dyestuff derived from tetrazotised benzidine-2,2'-disulfonic acid and acetoacet-2,4-xylidide and (c) the calcium salt of hydrogenated disproportionated rosin, while having adequate strength and good offset/letter press printing characteristics, could only provide adequate rheology when processed at pigment concentrations 35% by weight or less.

Likewise, a pigment composition containing (a) a pigment obtained by coupling acetoacet-2,4-xylidide on to tetrazotised 3,3'-dichlorobenzidine (b) a dyestuff derived from tetrazotised benzidine-2,2'-disulfonic acid and acetoacet-2,4-xylidide and (c) disproportionated rosin gave the desired rheology at high pigment concentration, but the product was colouristically too weak to be of commercial interest.

Moreover, publication gravure yellow pigments (which are e.g. Pigment Yellow 12 treated with amines) do not give satisfactory results in highly concentrated dispersions because of problems they create in terms of their water balance control on the press and their colouristic weakness.

Surprisingly, it has now been found that by selecting a particular combination of (a) dyestuff-treated pigment and (b) amine-treated pigment, a pigment composition is provided which not only exhibits adequate rheology at high pigment concentrations, but also has good colouristic properties together with good offset and letter press printing characteristics.

Accordingly, the present invention provides a pigment compositon, suitable for use in modern offset and letter press inks, comprising:

(A)

(a) a pigment derived from (i) acetoacet-2,4-xylidide coupled on to tetrazotised 3,3'-dichlorobenzidine or from (ii) the mixed coupling of two or more of acetoacetanilide, acetoacet-2-anisidide, acetoacet-2-toluidide, acetoacet-2-chloranilide, acetoacet-2,4-xylidide and acetoacet-2,5-dimethoxy-4-chloranilide on to tetrazotised 3,3'-dichlorobenzidine;

(b) a dyestuff derived from coupling acetoacetanilide, acetoacet-2-toluidide, acetoacet-2-chloranilide or acetoacet-2,4-xylidide on to tetrazotised benzidine-2,2'-disulfonic acid; and optionally (c) a resin or resinous material and (B)

(a) a pigment derived from coupling one or more of acetoacetanilide, acetoacet-2-anisidide, acetoacet-2-toluidide, acetoacet-4-toluidide, acetoacet-2-chloranilide, acetoacet-2,4-xylidide and acetoacet-2,5-dimethoxy-4-chloranilide on to one or both of tetrazotised 3,3'-dichlorobenzidine and tetrazotised 3,3'-dimethoxybenzidine; and (b) an aliphatic amine, the ratio of components (A) and (B) in the pigment composition of the invention ranging from 35:65 to 95:5.

The ratio ranges e.g. from 35:65 to 90:10% by weight, but preferably from 40:60 to 60:40% by weight.

The preferred pigment component A (a) is that derived by coupling a mixture of acetoacet-o-toluidide and acetoacet-2,4-xylidide on to tetrazotised 3,3'-dichlorobenzidine, so producing a mixture of dyes having the respective formulae I, II and III:

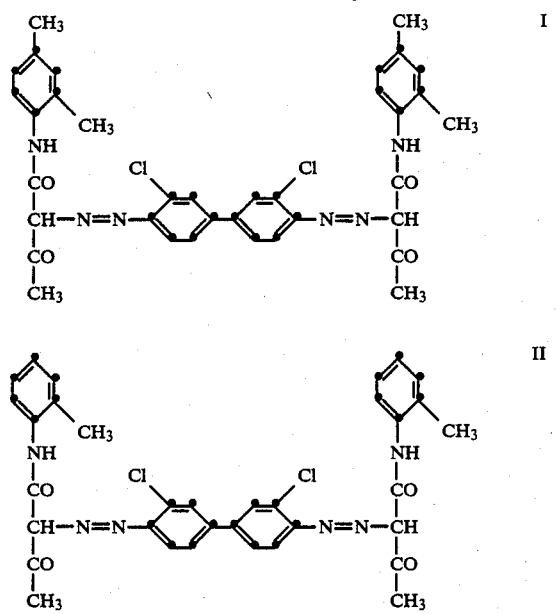

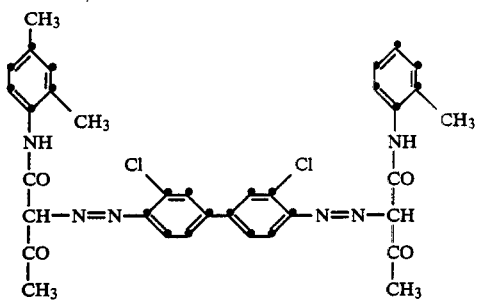

Pigment I is, of course, Pigment Yellow 13 (C.I. 21100) and Pigment II is Pigment Yellow 14 (C.I. 21095).

The preferred dyestuff component A (b) is that derived form acetoacet-2,4-xylidide coupled on to tetrazotised benzidine-2,2'-disulfonic acid and having the formula IV:

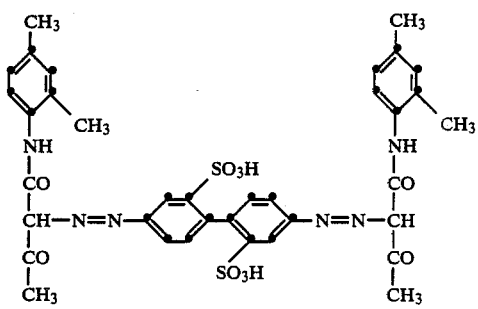

As indicated, component (A) of the pigment composition of the present invention optionally, but preferably contains a resin or resinous material.

Examples of such resins or resinous materials are wood resin and its derivatives such as hydrogenated wood rosin and, in particular, disproportionated wood rosin, preferably at least in part present as its alkaline earth, especially its zinc salt.

The proportion, by weight, of the dyestuff component A (b) in the total pigment component (A) of the invention is minor, ranging e.g. from 0.5 to 10% by weight, more preferably from 0.75 to 5% by weight, based on total pigment component (A).

The major component is the pigment component A (a) which amounts generally to 50 to 75% by weight of total component (A). Depending upon the composition of the offset or letterpress ink into which it is to be incorporated, component A (a) may contain from 15 to 45%, more preferably from 25 to 40% by weight of a resin component A (c), in particular a substantially 50:50 mixture by weight of (i) disproportionated wood rosin as free acid and (ii) disproportionated wood rosin as its salt.

The preferred pigment B (a) of the pigment composition of the invention is that derived by coupling aceto-acetanilide on to tetrazotised 3,3'-dichlorobenzidine giving a pigment of formula V:

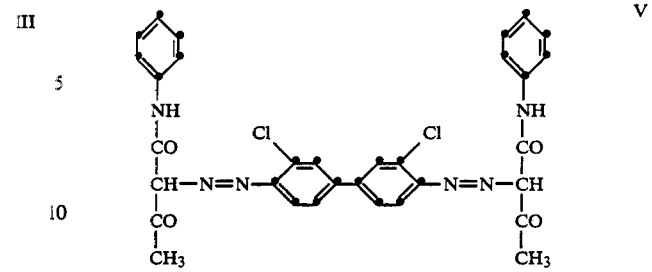

Pigment of formula V is Pigment Yellow 12 (C.I. 21090).

The amines used as component B (b) of the pigment compositions of the invention are primary amines such as stearylamine; rosin amines e.g. amine derivatives of wood rosin ("®Rosin Amine D"); N-long chain alkylalkylenediamines ("®DUOMEENS"); polyamines e.g. N-cocotrimethylene diamine-N'-propylamine; polyamide/polyamine derivatives ("®MERGINA-MIDE"); beta-amines ("®ARMEEN L11" and "®DUOMEEN L15"); and ethoxylated fatty amines and diamines ("®ETHOMEEN" and "®E-THODUOMEEN") and salts of these amines including quaternary ammonium salts ("®ARQUAD", "®DUOQUAD", "®ETHOQUAD"). The preferred amine components B (b) are the N-alkyl-propylenediamine.

For good product composition control, it is preferred to prepare components (A) and (B) separately, including optional and preferred resination of component (A), and then to blend components (A) and (B) in the desired ratio.

As already premised, the pigment compositions are particularly suitable for formulation into offset and letter press inks, in which they demonstrate excellent high pigment loadability (up to 55% by weight of pigment), while exhibiting good rheology under ink processing conditions, as well as good printing and colouristic properties.

Modern methods for the manufacture of offset and letterpress inks comprise the following:

The ink will normally be formulated by firstly preparing, e.g. in a bead mill, a concentrate based on a solvent base, a hyperdispersant and a resin and a high loading (35–50% by weight) of pigment. Typical ingredients of the concentrate are:

(1) Solvent base which constitutes at least 50% by weight of the ink and customarily comprises mainly aliphatic hydrocarbon distillate fraction of boiling points within the range 240° C. to 310° C.;

(2) Hyperdispersant constituting 0 to 10% by weight of the ink, for example, the dispersing agents derived from e.g. poly(12-hydroxystearic acid) and dimethylaminopropylamine in an organic liquid e.g. toluene as described in U.S. Pat. No. 4,461,647;

(3) Resins constituting 0–20% by weight of the ink composition and comprising for example an alkyd resin, a rosin-modified phenolic resin or a rosin ester; and (4) pigment.

Subsequently this concentrate will be let down, with suitable printing varnishes, to the final ink composition having suitable characteristics, e.g. a pigment content of 10–15% by weight, for the printing operation.

Further details of ink formulations of this type are described in "Printing Ink Formulations" by E. W.

Flinck, published in 1985 by Noyes Publications, for example at pp. 110 and 177.

The following examples further illustrate the present invention.

EXAMPLE 1A

An aqueous tetrazo solution prepared from 220 g of 3,3'-dichlorobenzidine is coupled to a mixed slurry containing 250 g of acetoacet-2,4-xylidide and 100 g of acetoacet-2-toluidide buffered at pH 4.0–5.0. The resulting pigment slurry is neutralised and a solution containing 12.5 g of water-soluble azo dyestuff prepared from tetrazotised benzidine-2,2'-disulphonic acid and acetoacet-2,4-xylidide is added followed by an aqueous solution of 260 g of a disproportionated wood rosin as its sodium salt. The mixture is heated to 95° C. and a solution of 35.0 g of zinc sulphate monohydrate is added followed by dilute hydrochloric acid to complete the precipitation of the resin. The mixture is heated at 90°–95° C. for a further 60 minutes when the pigment is isolated by filtration, washed free of impurities with water, and dried at 70° C. to give the final product.

EXAMPLE 1B

An aqueous tetrazo solution prepared from 300 g of 3,3'-dichlorobenzidine is coupled to 450 g of acetoacetanilide, then the product is slurried in an aqueous solution containing 140 g of a mixed alkylaminopropylamine as its acetate salt (®DINORAM 42), in which the number of carbon atoms in the alkyl groups falls predominantly in the range $C_{18}$–$C_{22}$, while maintaining the pH at 4.5. When coupling is complete the pH is adjusted to 11.7 and the mixture is heated to 95° C. and held at 95° C. for 60 minutes. The pigment is isolated by filtration, washed free of impurities with water, and dried at 80° C. to give the final product.

EXAMPLE 1C

Equal parts by weight of the products of example 1A and example 1B are blended to give the final product as a yellow powder.

EXAMPLE 2

(A) A dispersion vehicle is prepared having the following composition:

| | |
|---|---|
| Hydrocarbon resin (®Hercur A 120) | 8.5 g by weight |
| Alkyd resin (®Terlon 3) | 1.5 g by weight |
| ®Solsperse 17000 | 2.5 g by weight |
| ®Solsperse 22000 | 2.5 g by weight |
| Aliphatic hydrocarbon distillate | 85.0 g by weight (boiling range 260–290° C.) |

(B) 35% by weight, on total dispersion vehicle, of the pigment composition of example 1C is bead-milled into the dispersion vehicle. An ink is prepared from the pigmented vehicle by adding offset ink varnishes (solution, in aliphatic hydrocarbon distillate, of rosin-modified phenolic resin and alkyd resin).

The ink is then evaluated and the following performance is noted for the ink:

| Example/ Pigment | Dispersion (microscope) | Flow in bead mill | Offset performance | colour strength compared to Product 1C |
|---|---|---|---|---|
| 1 A | good | barely fluid | good | weaker (*) |
| 1 B | slightly inferior to 1 A | fluid | not usable | weaker (*) |
| 1 C | slightly superior to 1 A | extremely fluid | good | (*) |

(*) Products 1 A and 1 B require 120 or 130 parts (of pigment 1 A or 1 B respectively, to produce an ink equal in strength to an ink prepared from 100 parts of product 1 C. This clearly indentifies the unexpected result that the two components 1 A and 1 B, when used separately, are significantly weaker than when they are used together (product 1 C).

EXAMPLE 3

An aqueous tetrazo solution prepared from 175 g of 3,3'-dichlorobenzidine is coupled to a slurry containing 285 g of acetoacet-2,4-xylidide and 29.4 g of a product prepared as described in example 1B, while maintaining the pH at 4.5–5.0. 75 g of acetoacet-2-chloranilide are then added followed by a tetrazo solution prepared from 44 g of 3,3'-dichlorobenzidine. The pigment slurry formed is neutralised and a solution containing 11.9 g of the azo dyestuff from benzidine-2,2'-disulphonic acid coupled to acetoacet-2,4-dimethylanilide is added followed by an aqueous alkaline solution of 200 g of ®STAYBELITE Resin as its sodium salt. The mixture is heated to 95° C. and an aqueous solution containing 19.6 g of calcium chloride is added, followed by dilute hydrochloric acid to give a pH of 5.5. The mixture is held at 90°–95° C. for further 60 minutes and the product is then isolated by filtration, washing free of water-soluble impurities with water and drying at 80° C.

EXAMPLE 4

44 g of 3,3'-dichlorobenzidine are tetrazotised and coupled to 75 g of acetoacet-2-chloranilide and pH 4.5–5.0 in the presence of 29 g of a product prepared as described in example 1B.

285 g of acetoacet-2,4-dimethylanilide are then added followed by a tetrazo solution prepared from 175 g of 3,3'-dichlorobenzidine while maintaining the pH at 4.5–5.0. The pH is adjusted to 7.0 and solutions containing 11.9 g of the azo dyestuff from benzidine-2,2'-disulphonic acid coupled to acetoacet-2,4-dimethylanilide and an aqueous solution containing 200 g of ®STAYBELITE Resin as sodium salt are added. The mixture is heated to 95° C. and an aqueous solution containing 19.6 g of calcium chloride is added, followed by dilute hydrochloric acid to give a pH of 5.5. Heating at 90°–95° C. is continued for a further 60 minutes. The yellow pigment product is filtered off, washed free of water-soluble salts with water, and dried at 70° C.

EXAMPLE 5

Product A is made using the process described in example 1A but retaining the product in aqueous slurry form.

Product B is made using the process described in example 1B but using 488 g of the alkylaminopropylamine in place of 140 g and retaining the product in aqueous filtercake form.

Slurry containing 88.2 g of Product A is mixed with slurry containing 11.8 g of product B. The final product is obtained by filtration, washing free of water-soluble impurities, and drying at 70° C.

EXAMPLE 6

This is exactly as example 5 except that slurry containing 80.3 g of Product A is mixed with slurry containing 19.7 g of Product B.

EXAMPLE 7

Product A corresponds exactly to Product A in example 5.

Product C is made using the process described in example 1B but using 868 g of the alkylaminopropylamine in place of 140 g and retaining the product in aqueous filtercake form.

Slurry containing 94.1 g of Product A is mixed with slurry containing 5.9 g of Product C and the pigment is isolated by filtration, washing and drying at 80° C.

EXAMPLE 8

Exactly as example 7 except that slurry containing 90.1 g of Product A is mixed with slurry containing 9.9 g of Product C.

EXAMPLE 9

A product produced exactly as in example 1A, and a product produced exactly as in example 1B except that 70 g of a the alkylaminopropylamine are used in place of 140 g, were blended in equal parts by weight to give the final product.

EXAMPLE 10

A product produced exactly as in example 1A, and a product produced exactly as in example 1B except that 35 g of a the alkylaminopropylamine are used in place of 140 g, are blended in equal parts by weight to give the final product.

EXAMPLE 11

A product produced exactly as in example 1A, and a product produced exactly as in example 1B except that 140 g of a the alkylaminopropylamine are replaced by 140 g of ®TRINORAM S (N-alkyl dipropylene triamine, in which the number of carbon atoms in the alkyl group falls predominantly in the range $C_{16}$-$C_{18}$).

EXAMPLE 12

A product produced exactly as in example 1A, and a product produced exactly as in example 1B except that 140 g of a the alkylaminopropylamine are replaced by 140 g of ®POLYRAM S (N-alkylpolypropylene polyamine, in which the number of carbon atoms in the alkyl chain falls predominantly in the range $C_{16}$-$C_{18}$), are blended in equal parts by weight to give the final product.

We claim:

1. A pigment composition, suitable for use in modern offset and letter press inks, comprising:
(A)
  (a) a pigment derived from (i) acetoacet-2,4-xylidide coupled on to tetrazotised 3,3'-dichlorobenzidine or from (ii) the mixed coupling of two or more of acetoacetanilide, acetoacet-2-anisidide, acetoacet-2-toluidide, acetoacet-2-chloranilide, acetoacet-2,4-xylidide and acetoacet-2,5-dimethoxy-4-chloranilide on to tetrazotised 3,3'-dichlorobenzidine;
  (b) a dyestuff derived from coupling acetoacetanilide, acetoacet-2-toluidide, acetoacet-2-chloranilide or acetoacet-2,4-xylidide on to tetrazotised benzidine-2,2'-disulfonic acid; and optionally
  (c) a resin or resinous material
and
(B)
  (a) a pigment derived from coupling one or more of acetoacetanilide, acetoacet-2-anisidide, acetoacet-2-toluidide, acetoacet-4-toluidide, acetoacet-2-chloranilide, acetoacet-2,4-xylidide and acetoacet-2,5-dimethoxy-4-chloranilide on to one or both of tetrazotised 3,3'-dichlorobenzidine annd tetrazotised 3,3'-dimethoxybenzidine; and
  (b) an aliphatic amine,
the ratio of components (A) and (B) in the pigment composition of the invention ranging from 35:65 to 95:5.

2. A pigment composition according to claim 1 wherein the ratio of components (A) and (B) ranges from 40:60 to 60:40 by weight.

3. A pigment composition according to claim 1 wherein the pigment component A (a) is that derived by coupling a mixture of acetoacet-o-toluidide and acetoacet-2,4-xylidide on to tetrazotised 3,3'-dichlorobenzidine.

4. A pigment composition according to claim 1 wherein the dyestuff component A (b) is the dyestuff derived from acetoacet-2,4-xylidide coupled on to tetrazotised benzidine-2,2'-disulfonic acid.

5. A pigment composition according to claim 1 wherein the pigment component A (a) contains a resin or resinous material A (c).

6. A pigment composition according to claim 5 wherein the resin or resinous material is wood rosin or a derivative thereof, or is a polyamide resin.

7. A pigment composition according to claim 1 wherein the proportion of the dyestuff component A (b), in the total pigment component (A), ranges from 0.5 to 10% by weight.

8. A pigment composition according to claim 7 wherein the proportion of the dyestuff component A (b), in the total pigment component (A), ranges from 0.75 to 5% by weight.

9. A pigment composition according to claim 1 wherein the amount of the pigment component A (a) makes up 50 to 75% by weight of total pigment component (A).

10. A pigment composition according to claim 1 wherein the resin component A (c) makes up 15 to 45% by weight of total pigment component (A).

11. A pigment composition according to claim 1 wherein pigment component (B) a is Pigment Yellow 12.

12. A pigment composition according to claim 1 wherein the amine component B (b) is an N-alkylpropylendiamine.

13. A process for producing a pigment composition according to claim 1 comprising
  (a) preparing separately pigment components (A) and (B), as defined in claim 1, and
  (b) mixing the separately prepared pigment components (A) and (B) in the ratio specified in claim 1.

14. An ink concentrate suitable for offset and letter press inks comprising a pigment composition as claimed in claim 1.

15. An offset or letter press ink containing a pigment composition as claimed in claim 1.

* * * * *